United States Patent
Sun

(10) Patent No.: US 6,641,630 B1
(45) Date of Patent: Nov. 4, 2003

(54) CMP COMPOSITIONS CONTAINING IODINE AND AN IODINE VAPOR-TRAPPING AGENT

(75) Inventor: Tao Sun, Naperville, IL (US)

(73) Assignee: Cabot Microelectronics Corp., Aurora, IL (US)

( * ) Notice: Subject to any disclaimer, the term of this patent is extended or adjusted under 35 U.S.C. 154(b) by 0 days.

(21) Appl. No.: 10/165,133

(22) Filed: Jun. 6, 2002

(51) Int. Cl.[7] .............. B24B 1/00; C09G 1/02; C09G 1/04
(52) U.S. Cl. .............. 51/307; 51/308; 51/309; 51/298; 106/3; 438/692; 438/693; 451/28; 451/36; 216/88; 216/89; 216/100; 216/102; 216/105
(58) Field of Search .............. 51/307, 308, 309, 51/298; 106/3; 438/692, 693; 451/36, 28; 216/88, 89, 100, 102, 105

(56) References Cited

U.S. PATENT DOCUMENTS

| 4,769,046 | A | 9/1988 | Senda et al. |
| 5,489,233 | A | 2/1996 | Cook et al. |
| 5,527,423 | A | 6/1996 | Neville et al. |
| 5,958,794 | A | 9/1999 | Bruxvoort et al. |
| 6,001,269 | A | 12/1999 | Sethuraman et al. |
| 6,015,506 | A | 1/2000 | Streinz et al. |
| 6,062,968 | A | 5/2000 | Sevilla et al. |
| 6,117,000 | A | 9/2000 | Anjur et al. |
| 6,117,783 | A | 9/2000 | Small et al. |
| 6,126,532 | A | 10/2000 | Sevilla et al. |
| 6,290,736 | B1 | 9/2001 | Evans |
| 6,299,795 | B1 | 10/2001 | Liu et al. |
| 2002/0004360 | A1 | 1/2002 | Ota et al. |
| 2002/0010232 | A1 | 1/2002 | Ogawa et al. |
| 2002/0017630 | A1 | 2/2002 | Uchida et al. |

FOREIGN PATENT DOCUMENTS

| EP | 1 118 647 A1 | 7/2001 |
| EP | 1 150 341 A1 | 10/2001 |
| JP | 2000-109804 A | 4/2000 |
| WO | WO 02/20214 A2 | 3/2002 |

*Primary Examiner*—Michael Marcheschi

(57) ABSTRACT

The invention provides a chemical-mechanical polishing system, and a method of polishing using the system, comprising (a) an abrasive, a polishing pad, or both an abrasive and a polishing pad, (b) iodine, (c) an iodine vapor-trapping agent, and (d) a liquid carrier.

21 Claims, 1 Drawing Sheet

CMP COMPOSITIONS CONTAINING IODINE AND AN IODINE VAPOR-TRAPPING AGENT

FIELD OF THE INVENTION

This invention pertains to a chemical-mechanical polishing composition containing iodine and an iodine vapor-trapping agent.

BACKGROUND OF THE INVENTION

Compositions and methods for planarizing or polishing the surface of a substrate are well known in the art. Polishing compositions (also known as polishing slurries) typically contain an abrasive material in an aqueous solution and are applied to a surface by contacting the surface with a polishing pad saturated with the polishing composition. Typical abrasive materials include silicon dioxide, cerium oxide, aluminum oxide, zirconium oxide, and tin oxide. U.S. Pat. No. 5,527,423, for example, describes a method for chemically-mechanically polishing a metal layer by contacting the surface with a polishing slurry comprising high purity fine metal oxide particles in an aqueous medium. The polishing slurry is typically used in conjunction with a polishing pad (e.g., polishing cloth or disk). Suitable polishing pads are described in U.S. Pat. Nos. 6,062,968, 6,117,000, and 6,126,532, which disclose the use of sintered polyurethane polishing pads having an open-celled porous network, and U.S. Pat. No. 5,489,233, which discloses the use of solid polishing pads having a surface texture or pattern. Alternatively, the abrasive material may be incorporated into the polishing pad. U.S. Pat. No. 5,958,794 discloses a fixed abrasive polishing pad.

Conventional polishing systems and polishing methods typically are not entirely satisfactory at planarizing substrates, especially memory disks. In particular, such polishing systems and polishing methods can result in less than desirable polishing rates and high surface defectivity when applied to memory or rigid disks. Because the performance of many substrates, such as memory disks, is directly associated with the planarity of its surface, it is crucial to use a polishing system and method that results in a high polishing efficiency, selectivity, uniformity, and removal rate and leaves a high quality polish with minimal surface defects.

There have been many attempts to improve the removal rate of memory or rigid disks during polishing, while minimizing defectivity of the polished surface during polishing. For example, U.S. Pat. No. 4,769,046 discloses a method for polishing a nickel-plated layer on a rigid disk using a composition comprising alumina abrasive and a polishing accelerator such as nickel nitrate, aluminum nitrate, or mixtures thereof. U.S. Pat. No. 6,015,506 discloses a method for polishing rigid disks using a polishing composition comprising a dispersion of a metal oxide abrasive, an oxidizing agent, and a catalyst having multiple oxidation states. WO 02/20214 discloses a method for polishing memory or rigid disk substrates using a polishing composition comprising an oxidized halide and an amino acid.

Polishing compositions often contain oxidizing agents, which can react with the surface of a substrate, particularly a metal-containing substrate like a memory or rigid disk, and render the surface more susceptible to removal by mechanical abrasion. Oxidizing agents containing iodine (e.g., iodine, iodides, iodates, and periodates) are particularly useful in polishing metal-containing substrates; however, their use can be accompanied by the generation and subsequent release of noxious iodine vapor into the atmosphere. In order to avoid this problem, additives that are capable of trapping the iodine vapor must be added to the polishing composition. For example, EP 1 118 647 A1 discloses the use of polymers and co-polymers comprising polyvinylpyridine and polyvinylpyrrolidone to trap iodine vapors during the polishing process. However, the inclusion of additives for trapping iodine can have a detrimental effect on the substrate removal rates during polishing. Thus, there remains a need for polishing compositions containing additives to control the formation of iodine vapor and allow iodine-based oxidizing agents to be used on an industrial scale. The invention provides such a composition. These and other advantages of the invention, as well as additional inventive features, will be apparent from the description of the invention provided herein.

BRIEF SUMMARY OF THE INVENTION

The invention provides a chemical-mechanical polishing system comprising (a) an abrasive, a polishing pad, or both an abrasive and a polishing pad, (b) iodine, (c) an iodine vapor-trapping agent, and (d) a liquid carrier. The invention also provides a method of polishing a substrate using the chemical-mechanical polishing system.

DETAILED DESCRIPTION OF THE INVENTION

Figure 1:
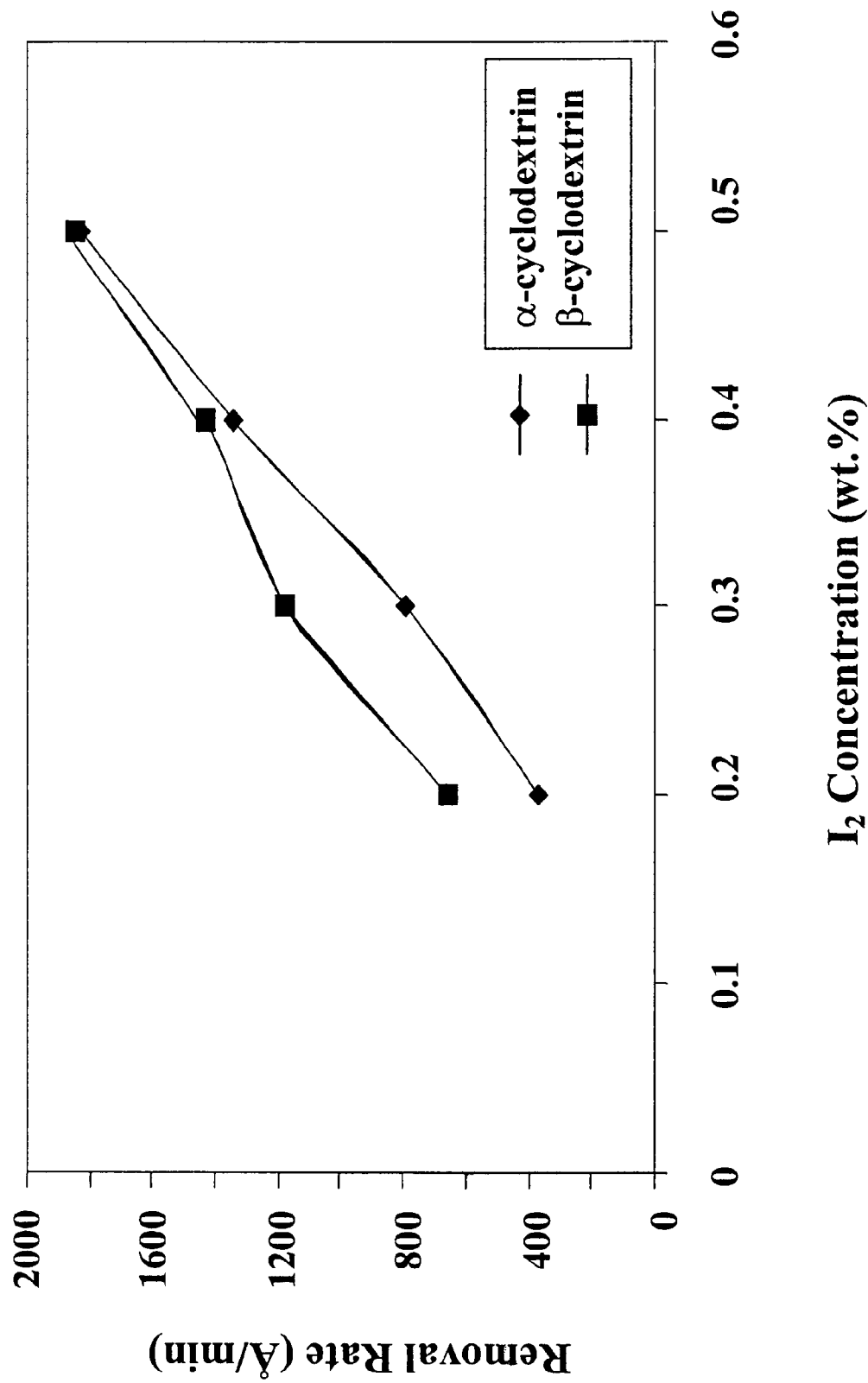
FIG. 1 is a plot of substrate removal rate versus iodine concentration for polishing compositions comprising α-cyclodextrin and β-cyclodextrin, respectively.

The invention is directed to a chemical-mechanical polishing system comprising an abrasive, a polishing pad, or both an abrasive and a polishing pad, iodine, an iodine vapor-trapping agent, and a liquid carrier.

The chemical-mechanical polishing ("CMP") system described herein comprises an abrasive, a polishing pad, or both. Preferably, the CMP system comprises both an abrasive and a polishing pad. The abrasive can be in any suitable form (e.g., abrasive particles). The abrasive can be fixed on the polishing pad and/or can be in particulate form and suspended in the liquid carrier. The polishing pad can be any suitable polishing pad. The abrasive (when present and suspended in the liquid carrier), the iodine, and iodine vapor-trapping agent, as well as any other components suspended in the liquid carrier, form the polishing composition of the CMP system.

The abrasive can be any suitable abrasive (e.g., a metal oxide). For example, the abrasive can be a metal oxide abrasive selected from the group consisting of alumina, silica, titania, ceria, zirconia, germania, magnesia, silicon nitride, silicon carbide, diamond, co-formed products thereof, and combinations thereof. The abrasive can also be a polymer particle or a coated particle. Typically, the abrasive is selected from the group consisting of alumina, silica, co-formed products thereof, coated metal oxide particles, polymer particles, and combinations thereof. Preferably, the abrasive is silica or alumina. The polishing system typically comprises about 0.1 wt. % to about 20 wt. % (e.g., about 0.5 wt. % to about 15 wt. %, or about 1 wt. % to about 10 wt. %) abrasive, based on the weight of the liquid carrier and any compounds dissolved or suspended therein.

The iodine typically is generated in situ from an iodide salt, an iodate salt, or a periodate salt. Accordingly the CMP system can comprise unreacted components used to make the iodine in situ, such as an iodide salt, an iodate salt, a periodate salt, and/or other component(s) described herein, such as oxidizing agents and reducing agents.

Typically, iodine is generated in situ by reaction of an iodide salt with an oxidizing agent. The iodide salt can be selected from the group consisting of potassium iodide, sodium iodide, lithium iodide, ammonium iodide, and combinations thereof. Preferably, the iodide salt is potassium iodide. The iodate or periodate salt can be any suitable salt including sodium salts, potassium salts, ammonium salts, and the like. The oxidizing agent can be any suitable oxidizing agent having an oxidation potential sufficient to oxidize the iodide salt under the conditions of the polishing system. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent also can be oxygen from the air when the polishing composition is sufficiently acidic. Preferably, the oxidizing agent is an iodate or peroxide, more preferably potassium iodate or hydrogen peroxide.

Alternatively, the iodine can be generated in situ by reaction of iodic acid, periodic acid, or a salt thereof, with a reducing agent. The reducing agent can be any suitable reducing agent. For example, the reducing agent can be a chemical additive to the polishing composition or, the reducing agent can be the substrate itself. Preferably, the reducing agent is a metal layer of a substrate being polished.

To reduce or eliminate the release of iodine vapor into the atmosphere, the chemical-mechanical polishing system further comprises an iodine vapor-trapping agent. The iodine vapor-trapping agent can be any suitable material that can trap iodine vapor and typically is a saccharide selected from the group consisting of starches and cyclodextrins. For example, suitable materials can be polymeric materials that have a helical or web-like structure that can trap iodine vapor or compounds having a cavity that encapsulate iodine by forming inclusion complexes.

Starches are oligomers or polymers containing α-D-glucose repeating units. The most common starches are amylose and amylopectin. Amylose has a helical structure that can trap iodine vapors. The starch can be linear, branched, cyclic, or cross-linked. Suitable starches and starch derivatives are disclosed, for example, in *Starch: Chemistry and Technology* (Whistler et al., Second Edition, 1984). Suitable starch derivatives include oxidized starches, esterified starches (e.g., acetate, glutarate, and phosphate esters), and etherified starches (e.g., hydroxyalkyl or carboxyalkyl ethers). Preferably, the starch is a low molecular weight starch, for example, a starch with a molecular weight of about 10,000 or less (e.g., about 5,000 or less).

Suitable cyclodextrins include α-cyclodextrin, β-cyclodextrin, γ-cyclodextrin, hydroxyalkyl-cyclodextrin, alkyl-cyclodextrin, acetyl-cyclodextrin, carboxyalkyl-cyclodextrin, or combinations thereof, where alkyl refers to linear or branched alkyls having 1–8 carbon atoms.

The amount of iodine present in the polishing composition will depend in part on the application. In some embodiments, only small amounts of iodine (e.g., about 0.2 wt. % or less, or about 0.1 wt. % or less, based on the weight of the liquid carrier and any components dissolved or suspended therein) are generated in situ, "for example, as a byproduct of a reaction between components of the polishing composition. In such applications, the generation of trace amounts of iodine typically is indicated by a yellowing of the polishing composition or the polishing pad during the course of chemical-mechanical polishing. In other embodiments, the amount of iodine present in the polishing composition is larger, for example, about 0.1 wt. % or more (e.g., about 0.2 wt. % or more, or about 0.5 wt. % or more) based on the weight of the liquid carrier and any components dissolved or suspended therein. The amount of iodine present in the polishing composition typically is about 10 wt. % or less (e.g., about 5 wt. % or less, about 3 wt. % or less) based on the weight of the liquid carrier and any components dissolved or suspended therein. In one preferred embodiment, the amount of iodine is about 0.1 wt. % to about 2 wt. % based on the weight of the liquid carrier and any components dissolved or suspended therein.

Preferably, the iodine, and/or the components used to produce the iodine in situ, are substantially dissolved in the liquid carrier. The liquid carrier is used to facilitate the application of the abrasive (when present and suspended in the liquid carrier), iodine, iodine vapor-trapping agent, and any optional additives to the surface of a suitable substrate to be polished (e.g., planarized). The liquid carrier also is used as the reaction medium enabling the reaction of the components that produce the iodine in the embodiment wherein the iodine is produced in situ in the polishing composition. The liquid carrier is typically an aqueous carrier and can be water alone, can comprise water and a suitable water-miscible solvent, or can be an emulsion. Suitable water-miscible solvents include alcohols such as methanol, ethanol, etc. Preferably, the aqueous carrier consists of water, more preferably deionized water.

The polishing composition can have any suitable pH. Typically, the polishing composition has a pH of about 2 or greater (e.g., about 3 or greater, or about 4 or greater) and a pH of about 12 or lower (e.g., about 11 or lower, or about 10 or lower). Preferably, the polishing composition has a pH of about 2 to about 10 (e.g., about 3 to about 9).

The polishing composition described herein optionally further comprises a corrosion inhibitor (i.e., a film-forming agent). The corrosion inhibitor can be any suitable corrosion inhibitor. Typically, the corrosion inhibitor is an organic compound containing a heteroatom-containing functional group. For example, the corrosion inhibitor is a heterocyclic organic compound with at least one 5- or 6-member heterocyclic ring as the active functional group, wherein the heterocyclic ring contains at least one nitrogen atom, for example, an azole compound. Preferably, the corrosion inhibitor is a triazole, more preferably, 1,2,4-triazole, 1,2,3-triazole, or benzotriazole.

The polishing composition described herein optionally further comprises a non-ionic surfactant. An example of a suitable nonionic surfactant is Tetronic ® surfactant sold by BASF Corporation.

The polishing composition described herein optionally further comprises a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or poly-alcohols (e.g., ethylene glycol, pyrocatechol, pyrogallol, tannic acid, and the like) and amine-containing compounds (e.g., ammonia, amino acids, amino alcohols, di-, tri-, and polyamines, and the like). Preferably, the complexing agent is a carboxylate salt, more preferably an oxalate salt. The choice of chelating or complexing agent will depend on the type of substrate layer being removed in the course of polishing a substrate with the polishing composition.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof; phthalates include phthalic acid, as well as mono-salts (e.g., potassium hydrogen phthalate) and di-salts thereof; perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The polishing system described herein can be used to polish (e.g., planarize) a substrate. The method of polishing the substrate comprises (i) contacting the substrate with the chemical-mechanical polishing system and abrading at least a portion of the substrate to polish the substrate. The chemical-mechanical polishing system desirably is used in a method of polishing a substrate comprising at least one metal layer and optionally an insulating layer, whereby the substrate is contacted with the chemical-mechanical polishing system and at least a portion of the metal layer or insulating layer (if present) of the substrate is abraded such that the metal layer or insulating layer becomes polished. The substrate can be any suitable substrate (e.g., an integrated circuit, memory or rigid disks, metals, ILD layers, semiconductors, micro-electro-mechanical systems, ferroelectrics, magnetic heads, polymeric films, and low and high dielectric constant films) and can contain any suitable insulating, metal, or metal alloy layer (e.g., metal conductive layer). The insulating layer can be a metal oxide, porous metal oxide, glass, organic polymer, fluorinated organic polymer, or any other suitable high or low-κ insulating layer. The insulating layer preferably comprises silicon oxide, silicon nitride, silicon oxynitride, silicon carbide, aluminum oxide, or a material with a dielectric constant of about 3.5 or less. The metal layer preferably comprises copper, tungsten, titanium, aluminum, tantalum, platinum, ruthenium (e.g., ruthenium dioxide), rhodium, iridium (e.g., iridium dioxide), nickel, iron or cobalt. In a preferred embodiment, the substrate is a memory disk comprising nickel phosphorus.

EXAMPLE

This example further illustrates the invention but, of course, should not be construed as in any way limiting its scope. This example illustrates the effect of iodine concentration on the removal rate of a memory disk substrate.

Similar memory disk substrates comprising nickel phosphorus were polished using a table top polisher (50 N downforce pressure, 100 rpm platen speed, 100 ml/min polishing composition feed rate) with different polishing compositions (Polishing Compositions A–H). Each polishing composition contained 4 wt. % colloidal silica and had a pH of 8.8. Polishing Compositions A–D further contained 0.5 wt. % α-cyclodextrin and 0.2, 0.3, 0.4, and 0.5 wt. % iodine, respectively. Polishing Compositions E–H further contained 0.5 wt. % β-cyclodextrin and 0.2, 0.3, 0.4, and 0.5 wt. % iodine, respectively. The substrate removal rates (RR) were determined for each of the polishing compositions. The results are summarized in the Table, and a plot of the removal rate versus iodine concentration is shown in the FIG.

TABLE

| Polishing Composition | Iodine Concentration | Iodine Vapor-trapping Agent | RR (Å/min) |
|---|---|---|---|
| A | 0.2 wt. % | α-cyclodextrin | 395 |
| B | 0.3 wt. % | α-cyclodextrin | 817 |
| C | 0.4 wt. % | α-cyclodextrin | 1374 |
| D | 0.5 wt. % | α-cyclodextrin | 1855 |
| E | 0.2 wt. % | β-cyclodextrin | 686 |
| F | 0.3 wt. % | β-cyclodextrin | 1208 |
| G | 0.4 wt. % | β-cyclodextrin | 1460 |
| H | 0.5 wt. % | β-cyclodextrin | 1878 |

The results shown in the Table and the FIG. illustrate that increasing the iodine concentration in the polishing composition results in an increase in the substrate removal rate. During the polishing of each substrate, it was noted that the presence of the iodine vapor-trapping agent substantially diminished the odor of the iodine vapor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chemical-mechanical polishing system comprising:
   (a) an abrasive, a polishing pad, or both an abrasive and a polishing pad,
   (b) iodine,
   (c) an iodine vapor-trapping agent selected from the group consisting of starches and cyclodextrins, and
   (d) a liquid carrier.

2. The chemical-mechanical polishing system of claim 1, wherein the iodine is generated in situ by oxidation of an iodide salt.

3. The chemical-mechanical polishing system of claim 2, wherein the iodide salt is selected from the group consisting of potassium iodide, sodium iodide, lithium iodide, ammonium iodide, and combinations thereof.

4. The chemical-mechanical polishing system of claim 2, wherein the iodide salt is oxidized by an oxidizing agent selected from the group consisting of iodate salts, peroxides, and combinations thereof.

5. The chemical-mechanical polishing system of claim 4, wherein the iodide salt is oxidized by an iodate salt.

6. The chemical-mechanical polishing system of claim 5, wherein the iodate salt is selected from the group consisting of potassium iodate, sodium iodate, lithium iodate, ammonium iodate, and combinations thereof.

7. The chemical-mechanical polishing system of claim 5, wherein the amount of iodide salt is about 0.1 wt. % to about 2 wt. % based on the weight of the liquid carrier and any components dissolved or suspended therein, and the amount of iodate salt is about 0.1 wt. % to about 2 wt. % based on the weight of the liquid carrier and any components dissolved or suspended therein.

8. The chemical-mechanical polishing system of claim 1, wherein the iodine is generated in situ by reduction of iodic acid, periodic acid, or a salt thereof.

9. The chemical-mechanical polishing system of claim 8, wherein the amount of iodine is about 0.2 wt. % or less.

10. The chemical-mechanical polishing system of claim 1, wherein the iodine vapor-trapping agent is a cyclodextrin selected from the group consisting of α-cyclodextrin, β-cyclodextrin, γ-cyclodextrin, hydroxyalkyl-cyclodextrin, alkyl-cyclodextrin, acetyl-cyclodextrin, carboxyalkyl-cyclodextrin, and combinations thereof.

11. The chemical-mechanical polishing system of claim 1, wherein the iodine vapor-trapping agent is a starch having a molecular weight of about 10,000 or less.

12. The chemical-mechanical polishing system of claim 1, wherein the amount of iodine is about 0.1 wt. % to about 2 wt. % based on the weight of the liquid carrier and any components dissolved or suspended therein.

13. The chemical-mechanical polishing system of claim 1, wherein the polishing system comprises an abrasive suspended in the liquid carrier.

14. The chemical-mechanical polishing system of claim 13, wherein the polishing system comprises an abrasive selected from the group consisting of alumina, silica, ceria, germania, titania, silicon nitride, silicon carbide, diamond, polymer particles, co-formed particles, coated particles, and combinations thereof.

15. The chemical-mechanical polishing system of claim 14, wherein the abrasive is silica.

16. A method of polishing a substrate comprising:
   (i) contacting the substrate with the chemical-mechanical polishing system of claim 1, and
   (ii) abrading at least a portion of the substrate to polish the substrate.

17. The method of claim 16, wherein the substrate is a memory disk.

18. The method of claim 16, wherein the substrate comprises a metal layer.

19. The method of claim 18, wherein the metal layer comprises platinum, iridium, rhodium, ruthenium, nickel, aluminum, copper, tungsten, tantalum, or titanium.

20. A method of polishing a substrate comprising:
   (i) contacting the substrate with the chemical-mechanical polishing system of claim 2, and
   (ii) abrading at least a portion of the substrate to polish the substrate.

21. The method of claim 20, wherein the substrate comprises a metal layer.

* * * * *